United States Patent [19]

Hartger et al.

[11] 4,016,686

[45] Apr. 12, 1977

[54] STORAGE ENCLOSURE FOR SMALL VEHICLES

[75] Inventors: Richard W. Hartger, Grand Rapids; Richard W. Figgins, Orchard Lake, both of Mich.

[73] Assignees: Richard W. Harger; Harold V. Hartger, both of Grand Rapids, Mich.

[22] Filed: Sept. 2, 1975

[21] Appl. No.: 609,558

[52] U.S. Cl. .................................. 52/65; 52/79.9; 52/234; 52/579; 52/584; 206/335; 312/199; 312/283

[51] Int. Cl.² ......................................... E04H 6/08

[58] Field of Search ................. 52/64, 234, 79, 97, 52/579, 19, 174, 65, 584; 206/335; 217/37, 38; 211/17–22; 312/199, 283

[56] References Cited

UNITED STATES PATENTS

| 542,096 | 7/1895 | Mumford | 217/37 |
|---|---|---|---|
| 603,667 | 5/1898 | Tate | 312/199 |
| 633,806 | 4/1899 | Cifka | 211/17 |
| 1,986,999 | 1/1935 | Burgess | 52/174 |
| 2,220,373 | 11/1940 | Krauser et al. | 52/584 X |
| 2,742,674 | 4/1956 | Melder | 52/64 |
| 2,976,966 | 3/1961 | Latzko | 52/234 |
| 2,987,355 | 6/1961 | Sandefur | 312/23 |
| 3,203,143 | 8/1965 | Swenson | 52/64 |
| 3,438,158 | 4/1969 | Kane | 52/64 |
| 3,470,657 | 10/1969 | Irwin | 52/79 X |
| 3,566,554 | 3/1971 | Schaffer et al. | 52/79 X |
| 3,665,661 | 5/1972 | Beckerer | 52/19 |
| 3,734,272 | 5/1973 | Galen | 206/1 R |
| 3,784,089 | 1/1974 | Koch | 312/199 X |
| 3,796,015 | 3/1974 | Kane | 52/64 |
| 3,832,811 | 9/1974 | Briel, Jr. | 52/79 X |
| 3,949,528 | 4/1976 | Hartger et al. | 52/79 |
| 3,967,425 | 7/1976 | Wolverton | 52/79 |

FOREIGN PATENTS OR APPLICATIONS

| 173,544 | 6/1952 | Australia | 52/64 |
|---|---|---|---|
| 782,194 | 4/1968 | Canada | 52/79 |
| 870,081 | 3/1942 | France | 52/64 |
| 1,523,458 | 3/1968 | France | 52/79 |
| 1,508,319 | 11/1967 | France | 52/79 |
| 730,879 | 8/1932 | France | 52/236 |
| 41,712 | 10/1965 | Germany | 52/79 |
| 107,466 | 7/1898 | Germany | 217/38 |
| 815,100 | 8/1951 | Germany | 52/174 |
| 456,010 | 3/1950 | Italy | 52/174 |
| 185,078 | 7/1936 | Switzerland | 217/38 |
| 238,101 | 6/1945 | Switzerland | 52/174 |
| 146,797 | 5/1931 | Switzerland | 52/174 |
| 233,109 | 5/1925 | United Kingdom | 52/66 |
| 1,302,184 | 1/1973 | United Kingdom | 52/79 |

OTHER PUBLICATIONS

"Bikelokr Is Here!" Boke Lockers, Inc., Walnut Creek, California.

*Primary Examiner*—Leslie Braun
*Attorney, Agent, or Firm*—Price, Heneveld, Huizenga & Cooper

[57] ABSTRACT

Storage apparatus for small vehicles and the like such as bicycles and motorcycles and the like including at least one storage unit having a roof, end members and rigid channel means for joining and supporting said roof and end members over a supporting surface, and for joining one of the units to another storage unit, side closure, wall, or the like. The rigid channel includes a recessed portion to drain rain water from the unit or units and secures interior divider panels which separate the interior of one unit from the interior of another and also segregate the interior of each unit into discrete storage areas.

23 Claims, 15 Drawing Figures

STORAGE ENCLOSURE FOR SMALL VEHICLES

BACKGROUND OF THE INVENTION

This invention relates to building structures and, more particularly, to building structures designed to house and store small vehicles such as bicycles, motorcycles, snowmobiles, and the like.

Recent years have seen an increase in popularity in many forms of recreation using small vehicles such as bicycles, motorcycles, and snowmobiles. In populated areas where large numbers of such vehicles such as bicycles are used daily, i.e., in cities and on college campuses, such increase in popularity has resulted in an increase in demand for protection of such vehicles. One form of protection proposed for bicycles and the like has been individual storage enclosures for rental or lease in such areas. The provision of adequate storage enclosures to meet such demands involves the solution of several problems including the provision of strong, secure storage areas which not only protect the bicycles and other vehicles from the effects of weather but also from theft and vandalism. An attendant problem is the provision of such protection in a minimum of space.

In the past, attempted solution of such problems has included the provision of individual, four-sided structures for each vehicle which take up relatively large amounts of space. However, such prior structures and others have required many parts, have been relatively difficult to assemble and manufacture on a mass production basis and have suffered from weaknesses in strength and resistance to theft and vandalism.

The present invention recognizes and provides a solution to the above problems by providing a storage apparatus which utilizes a minimum of space, is formed from a series of sandardized parts making it both inexpensive to manufacture and efficient to assemble, and yet is of extremely high strength and is very difficult to vandalize or break open. Moreover, the structure is designed to allow a plurality of units to be easily secured together while maintaining privacy and individual security for each storage area within the series of units. Use of space is minimized such that a group of enclosures can be easily located together in a centralized location near a dorm or living unit on a college campus, an office building, or the like. Further, the structure is designed to be highly resistant to weather over a long period of time.

SUMMARY OF THE INVENTION

Accordingly, it is an object and purpose of the present invention to provide a storage structure for small vehicles and the like such as bicycles, motorcycles, and snowmobiles including at least one storage unit having a roof and opposing end portions supported above a supporting surface by a rigid channel member which joins the various portions together and supports them above the supporting surface. The channel member also provides a means for fastening the storage units to a side closure, wall, or another of the same type of unit such that the units can be fastened together in a series or row if desired, and also provides a means for draining rain water and the like from such units. The storage structure, therefore, includes storage units which may be used either individually or in series to provide strong, secure, and effective protection against weather, theft or vandalism, and yet utilizes a minimum of space for storing a given number of bicycles or other small vehicles.

In a broad aspect of the invention, storage apparatus is provided for small vehicles and the like including bicycles, motorcycles, and snowmobiles including at least one protective storage unit having generally opposite, lateral side edges, at least one roof member, a pair of generally opposite end members, and a rigid channel means along at least one of the said side edges. The rigid channel means joins the roof and end members together and supports those members in a protective structure over a supporting surface. The channel means includes first wall means for joining the roof and end members to the channel means and second wall means for joining said storage unit to another of said storage units or to a side closure, wall, or the like. The wall means define a drainage channel therebetween which opens outwardly away from the interior of the unit for draining water off said unit. The roof and end members each include securing means on the other of said opposing side edges for joining said respective member to another of said channel means whereby the storage unit may be used individually or joined to other storage units in side-by-side fashion.

In other aspects of the invention, a channel means is provided on each side of a storage unit. A divider panel is secured between the opposing end portions of each channel means except those channel means at the ends of the row of storage units to separate one unit from another. A diagonal dividing panel extends on an angle across the interior of the storage unit from one end of one channel means to the opposite end of the other channel means to divide the interior into a pair of wedge-shaped spaces. Hinged doors are provided on either end, each door allowing access to only one wedge-shaped section.

In the preferred embodiment, the rigid channel means includes a base and a pair of spaced side flanges or walls extending outwardly away from the interior of the storage unit along the entire length of the channel. Mating side flanges on the roof and end members are secured to the channel flanges or walls while the channel itself is continuous on three sides.

These and other objects, advantages, purposes, and features of the invention will become more apparent from a study of the following description taken in conjunction with the drawings.

DESCRIPTION OF THE PREFERRED EMBODIMENT

Figure 1:
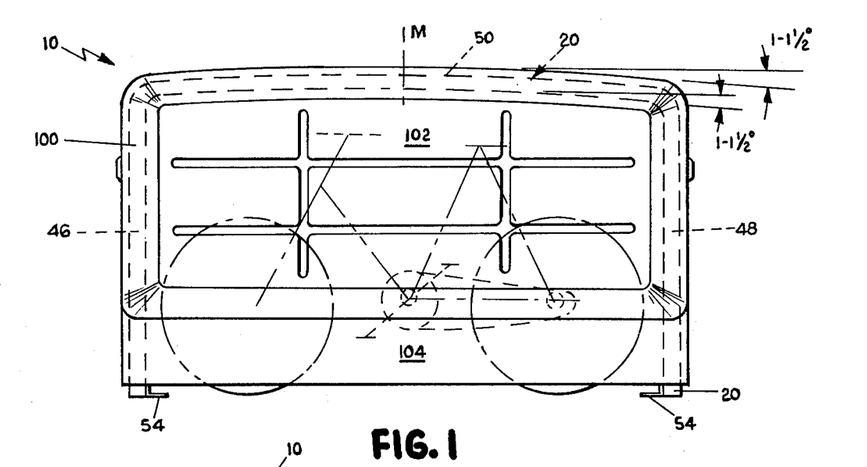
FIG. 1 is a side view of a plurality of the storage units of the present invention secured together in side-by-side fashion and illustrating the storage of a bicycle therein.
Figure 2:
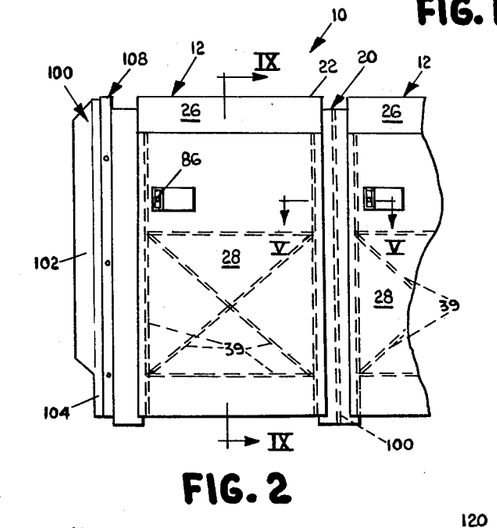
FIG. 2 is a fragmentary, end elevation of a pair of the present storage units and a side closure panel secured together by channel means of the present invention.
Figure 3:
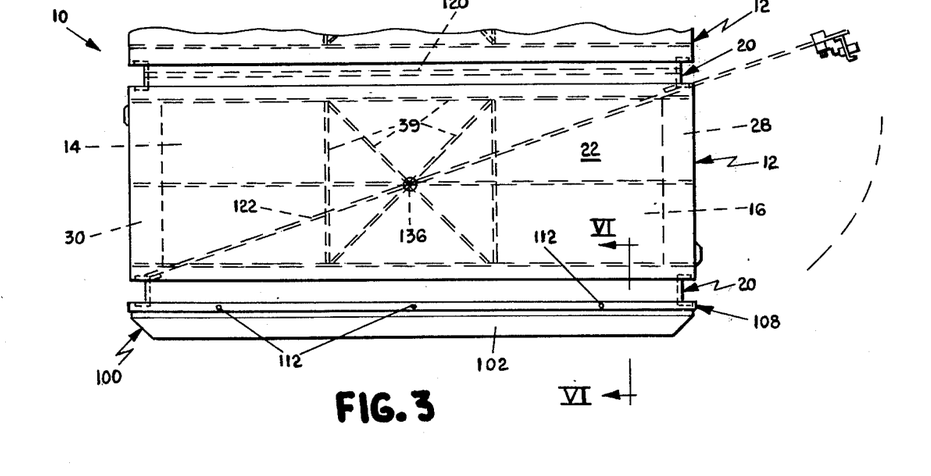
FIG. 3 is a fragmentary, plan view of the storage unit and side closure panel secured together as shown in FIG. 2.
Figures 4, 5, 6, 7, 14, 15:
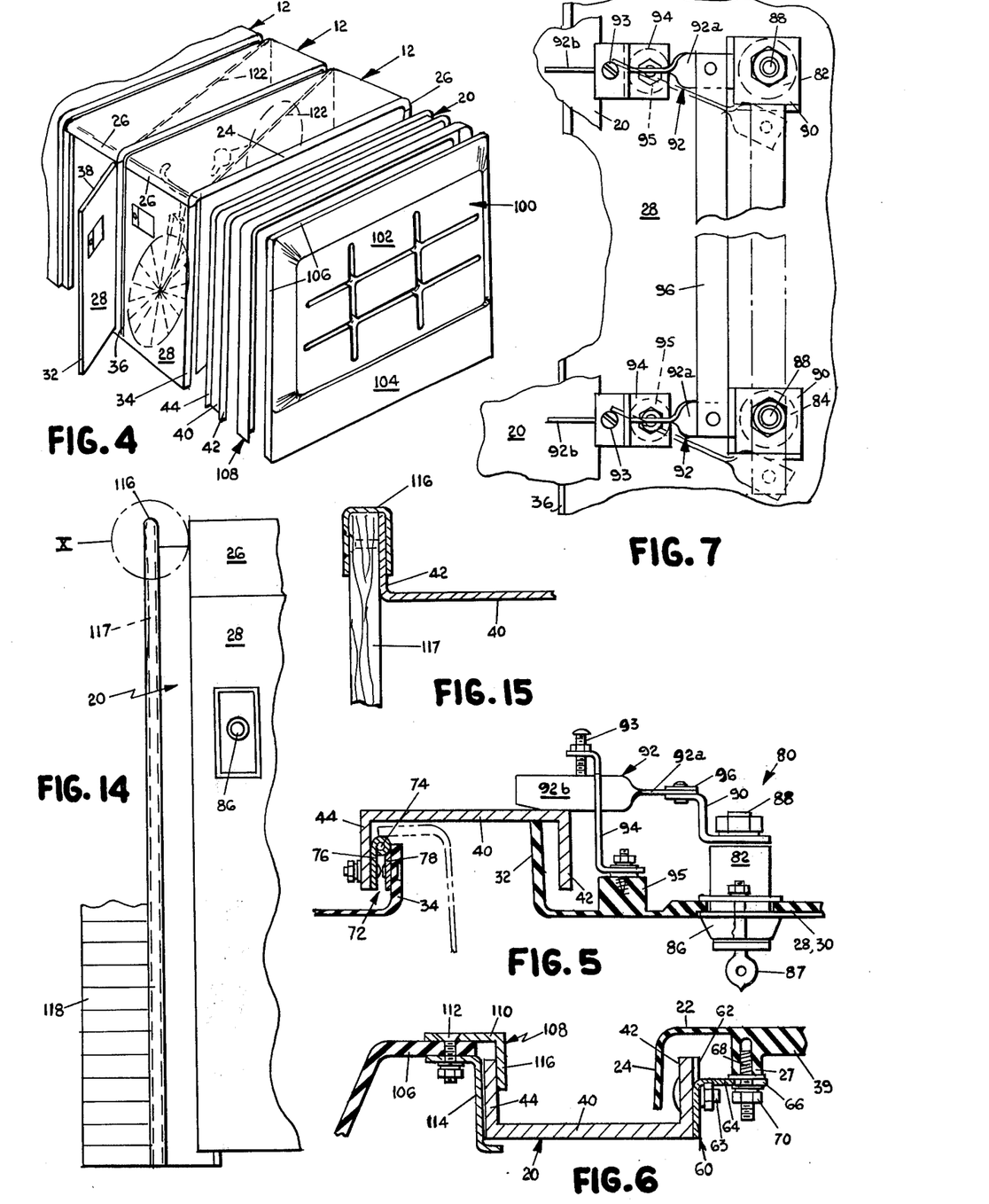
FIG. 4 is an exploded, fragmentary, perspective view of three of the storage units and a side closure panel and the channel means for securing them together with the door to one of the wedge-shaped storage spaces shown in open position.
FIg. 5 is a fragmentary, sectional, plan view of the channel means of the present invention including portions of the end door members latched and hingedly secured thereto taken along line V—V of FIG. 2.
FIG. 6 is a fragmentary, sectional, end view of a roof portion and the top of a side closure panel secured together with the channel means taken along line VI—VI of FIG. 3.
FIG. 7 is a broken, rear elevation of one of the door or end members of the present invention illustrating the latching apparatus for securing the door in a closed position.
FIG. 14 is a fragmentary, end elevation of one storage unit and an alternative side closure structure.
FIg. 15 is an enlarged, fragmentary, sectional end view of area XV of FIG. 14 illustrating the means for securing the alternate side closure to the channel means of the present invention.
Figure 8:
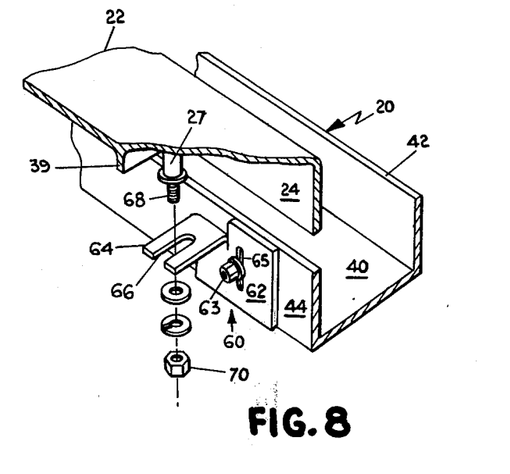
FIG. 8 is a fragmentary, perspective view of one of the brackets for securing one of the roof members to one of the channel means of the present invention.

Referring now to the drawings in greater detail, FIGS. 1–4 illustrate the preferred form of the present storage structure 10 for bicycles, motorcycles, snowmobiles, other small vehicles, tools, and the like. The storage structure includes a plurality of individual storage units 12 each of which is in turn divided into a pair of wedge-shaped storage spaces 14, 16 as shown in FIG. 3. Each of the storage units 12 is secured together by a rigid channel member 20 extending along the side edges of each unit and located between and spacing apart the adjacent units. Channel members 20 join and support the individual portions of each unit together, connect the several units in side-by-side fashion such that the units may be assembled in a row as shown in FIG. 4, bear a portion of the stress and load of the weight of the structural elements, and thereby provide strength and rigidity for the structure. Additionally, the channel members are recessed and provide water drainage from between the individual storage compartments.

Figures 9, 10, 11:
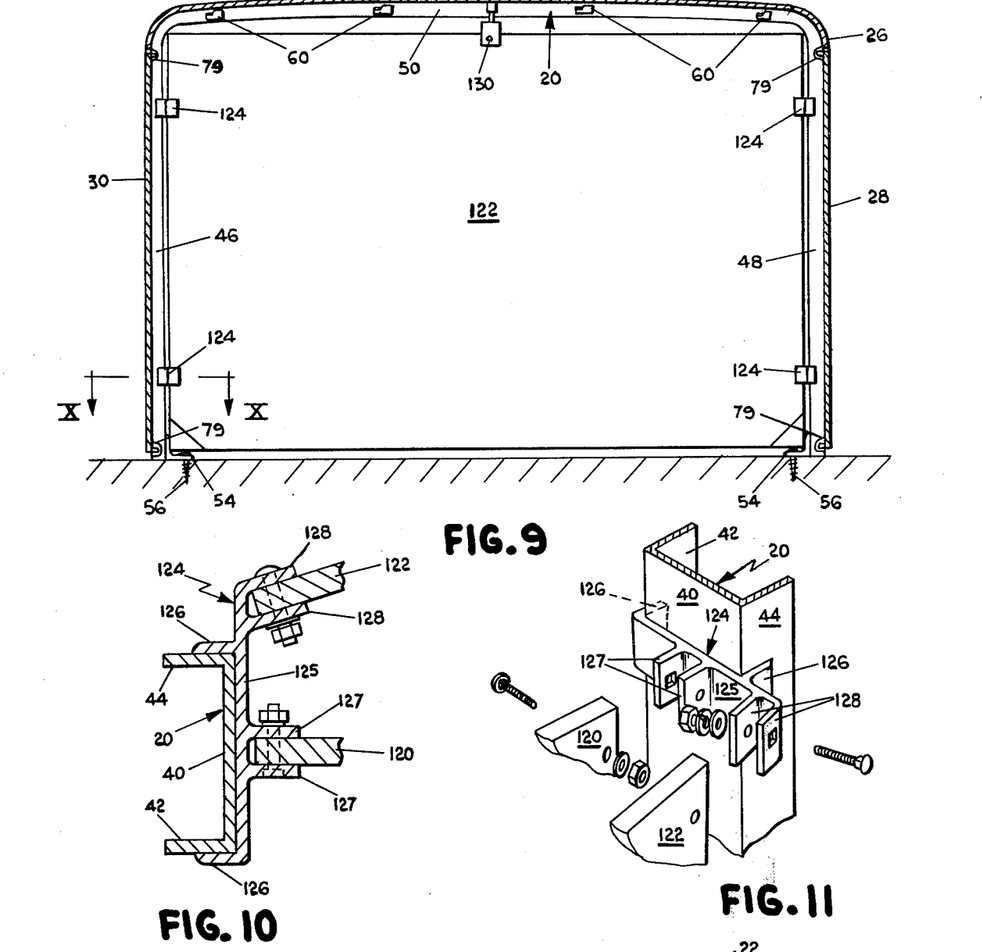
FIG. 9 is a sectional side elevation of one of the storage units of the present invention taken along plane IX—IX of FIG. 2.
FIG. 10 is a fragmentary, sectional view taken along plane X—X of FIG. 9 and illustrating one of the brackets for securing the divider panels within the storage units.
FIG. 11 is a fragmentary, perspective view of the bracket member shown in FIG. 10.

As shown in FIGS. 1–4, each individual storage unit 12 in the preferred embodiment includes a generally rectangular roof panel 22 including a pair of generally opposite and parallel lateral side edges each including downwardly extending side flanges 24 (FIGS. 4, 6, and 8) and a pair of downwardly curving end flanges 26 (FIGS. 2, 4, and 9). Each unit also includes a pair of generally vertically upstanding, opposite, end panels 28 and 30 on opposing ends of the storage units (FIGS. 4 and 9). In the preferred embodiment, end panels 28 and 30 on each unit are hingedly secured along their right edges to channels 20 such that they swing horizontally between open and closed positions to provide access to the interiors of the storage units as shown in FIGS. 3, 4, and 5. End panels 28 and 30 include generally parallel, inwardly extending side flanges 32 and 34, respectively, as well as inwardly extending end flanges 36 and 38, respectively. As seen in FIGS. 2–4, the roof and end panels are generally of the same width such that the lateral side flanges on the various roof and end panels lie in generally common, vertical planes on either lateral side of each storage unit 12. Also, as shown in FIGS. 2, 3, 6, and 8, each of the roof and end panels 22, 28, and 30, respectively, preferably include molded, inwardly extending ribs 39 extending parallel to the edges thereof and in an "X" shape at the center of each panel. Such ribs 39 project inwardly toward the interior of the units and strengthen and rigidify the otherwise planar roof and end panels. Such ribs substantially resist flexing of the panels to prevent the well-known "oil can" effect.

Figure 12:
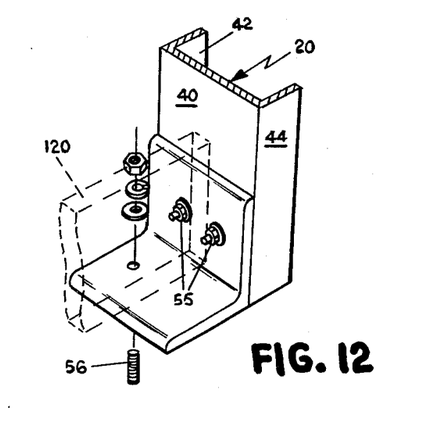
FIG. 12 is a fragmentary, perspective view of the securing means for securing the lower portion of one of the channel members to a supporting surface.

As shown in FIGS. 4–6 and 8–12, each channel member 20 includes a base portion 40 extending along the entire length of the channel and a pair of generally parallel, spaced side flanges or walls 42, 44 formed integrally with the base portion and extending outwardly from the base section in the same direction. Thus, the side flanges and base portion of the channel form a generally U-shaped channel or cross section extending the length of the channel member. The opening to that channel portion is directed outwardly around the entire contour of member 20. As shown in FIGS. 1 and 9, the channel member is preferably bent into three sides such that it has the general shape of a rectangle with the fourth side missing. It includes two upstanding end portions 46, 48 and a generally horizontally extending roof portion 50 extending between the upper ends of the end portion. The lower ends are supported by the supporting surface for the storage unit. Each of those lower ends is secured to the supporting surface with a generally L-shaped securing bracket 54 (FIGS. 1, 9, and 12). Brackets 54 are bolted to base 40 of channel 20 with bolts 55 and to the supporting surface with a lag screw 56 or the like. Lag screws 56 are offset from the center of the lower flange of brackets 54 so that a wrench can be fitted thereon even while dividing partition 120 is in place.

Each of the channel members 20 joins together and supports the roof and two end panels in a protective structure over the supporting surface. Normally, when a series of storage units are secured together in side-by-side fashion as shown in FIGS. 2–4, a channel is secured on either side of each storage unit. In such case, side flanges 24 of roof panels 22 mate with, engage, and overlap the side flanges 42 or 44 of the roof portion 50 of channel members 20 or 25 (FIG. 6). In order to secure the roof panels 22 to the channel flanges without the necessity of protruding rivets or bolts, a plurality of roof securing brackets 60 (FIGS. 6, 8, and 9) are secured at spaced points along roof portion 50 of channel 20. Brackets 60 include a generally planar body flange 62 bolted with bolts 63 extending through apertures 65 to one of the upstanding channel side flanges 42, 44 while a flange 64 extending at right angles to body 62 engages a downwardly extending molded projection 27 on the underside of the top of roof panel 22. Projection 27 includes a threaded stud 68 extending through and bolted in a recess 66 in flange 64 by nuts 70. Apertures 65 and 66 in brackets through which bolts 63 extend are elongated (FIG. 8) to allow vertical and horizontal adjustment of the position of roof panels 22 so that a tight fit with the upper edge of door panels 28, 30 and proper overlap with the channel members is obtained. Projections 27 are long enough to space panel 22 above the top edges of side walls 42, 44 while flanges 24 are spaced away from side walls 42, 44 to allow lateral adjustment.

Preferably, each of the end panels 28, 30 is hingedly secured to channel flange 44 on the right-hand side of the door opening on end portion 46, 48 of one of the channel members 20 on either end of each storage unit 12. As is best seen in FIG. 5, an elongated, piano-type hinge 72 is secured generally vertically along substantially the entire height of the door or end panel on the inside of the U-shaped channel portion of one of the end portions of the channel members. Hinge 72 is secured via a plurality of rivets or bolts passed through one of the hinge flanges 76 and channel flange 44. The remaining hinge flange 78 is secured to lateral side flange 34 of one of the end panels 28 or 30 on the inside surface thereof. Hence, the swivel pin 74 of the hinge 72 is positioned adjacent the base portion 40 of the channel with the hinge allowing the door to swing generally horizontally such that flanges 34 and 44 do not obstruct one another when the door is open. Normally, hinge 72 will be positioned on the right-hand side of the door such that the hinge is secured to channel flange 44. In order to allow complete closing of the hinged end panels or doors 28, 30 which include side and end flanges 32-38, generally horizontally extending slots or recesses 79 (FIG. 9) are formed in channel flanges 42, 44 to receive end flanges 36, 38.

Also included on each door or end member is a latching and locking mechanism 80 best seen in FIGS. 5 and 7. Latch mechanism 80 includes a pair of inwardly extending, generally cylindrical, vertically spaced latch projections 82, 84 bolted or riveted to the inside surface of the door or end panel 28, 30. The upper cylinder includes a conventional lock assembly 86 which extends through the cylinder and is operated by a key 87 to rotate the same. Mounted on swivel post or pin 88 in each of the cylinders 82, 84 are generally S-shaped swivel brackets 90 which are pivotally secured to at their outer flanges to elongated latch members 92. Latch members 92 include flange portions 92a, 92b which are twisted at right angles to one another such that the edges of flange portions 92b engage the rear surfaces of channel members 20 to provide greater strength in holding the door in a closed position. Each of the latch members 92 is guided for withdrawal and extension from behind the channel members by generally S-shaped guide brackes 94 which are secured by bolts or the like to molded projections 95 extending inwardly from the rear surface of the end or door members 28, 30 as shown in FIG. 5. Guide brackets 94 include rectangular apertures through their central portions allowing the passage of latch members 92. Guide bolts 93 are provided in the outer flanges of brackets 94 to help guide movement of latch members 92. When the lock cylinder 86 is rotated by the corresponding key 87, the upper swivel bracket 90 is rotated causing a corresponding rotational movement of upper latch member 92. An elongated, rectilinear connecting bar 96 extends between the pivotal connections of swivel brackets 90 and latch members 92 such that the lower latch member 92 moves in unison with the upper latch member. As shown in FIG. 7, counterclockwise rotation of key 87 and thus the latch members 92 withdraws the latch members from behind the channel while clockwise rotation extends the latch members to their locking positions behind the channel member to retain the door in a tightly closed position.

In order to close the lateral side of the end storage unit when a plurality of storage units are secured in side-by-side fashion as shown in FIGS. 2-4, or in order to close one or both sides of a single storage unit when used individually, one of several different types of side closure panels may be used and secured to the remaining channel flange 42 or 44 opposite the channel flange secured to the side flanges of the roof and end members. As shown in FIGS. 1-4 and 6, one embodiment of the side closure panel is a molded, rectangular end panel 100 including a raised, inclined, molded area 102 spaced above the lower supporting portion 104. Area 102 includes a waffle-like pattern of recessed ribs or channels molded therein for strength and resistance to deflection. Panel 100 includes an inwardly extending flange 106 (FIG. 4) extending around the entirety of the panel which engages a three-sided angle member 108 (FIGS. 4 and 6) having flanges at right angles to one another for securing the side panel to one of the flanges 42, 44 of a channel member. As shown in FIG. 6, one of the leg flanges 110 of angle member 108 is secured to inwardly extending flange 106 of end panel 100 by a series of spaced bolts 112 extending through flange 110, inwardly extending flange 106, and through one flange of a generally S-shaped clamping bracket 114. The side wall and a portion of the base portion of channel member 20 are, therefore, clamped between bracket 114 and the remaining flange 116 of angle member 108. Thus, angle member 108 closes the gap between the side panel 100 and channel member 20 and effectively seals out water, snow, sleet, and the like from the side of the storage unit.

Alternately, instead of a molded panel 100, a generally planar, wooden sheet 117 may be secured to the channel flange 42 to provide a side closure as shown in FIGS. 14 and 15. In this case, flange 42 is bolted or screwed with appropriate fasteners to the edges of wooden sheet 117 while a capping channel 116 is fitted over the combined flange 42 and sheet 117 to seal the joint therebetween to prevent entry of water into the unit. Capping channel 116 may be provided to extend along the entirety of the joint from supporting surface upwardly along both end portions of the unit and across the roof portion.

To further secure the alternate side closure structure, a brick wall 118 may be constructed along the exposed surface of wooden sheet 117. Alternately, channel flange 42 may be secured directly to brick wall 118 or other upstanding surface without the intermediate wooden sheet 117. In such case, a sealing gasket or the like would be fitted between flange 42 and the wall in place of the capping channel 116.

As is shown especially in FIGS. 4-6 and 8-12, base portions 40 of the several channel members 20 are recessed inwardly of the outer edges of side channel flanges 42, 44 as well as the principal outer surfaces of roof portion 22 and end panel 28, 30. Such recess serves as a trough or channel for collecting and draining rain water which falls on the assembled units. In order to facilitate such drainage, both the roof portion 50 of the channel members 20 and the top surfaces of the roof panels 22 may be sloped downwardly toward either end of the storage unit from a midpoint M at an angle of approximately 1° to 1½° as shown in FIG. 1.

Additionally, as shown in FIG. 2, each of the roof portions may be sloped downwardly toward either lateral side edge thereof and toward the recessed channels on either side thereof from a longitudinal center line at approximately the same 1° to 1½° angle.

In order to separate the individual storage areas in each storage unit from one another and the next adjacent units, a series of divider panels 120 and 122 are secured in each unit by securing brackets 124 fastened to the generally vertically extending end portions of the interior faces of channels 20 as shown in FIGS. 3 and 9–11. A pair of brackets 124 is secured on each end of each channel 20. Each bracket 124 is preferably extruded from aluminum and includes a back portion 125 and integral feet 126 spaced apart a distance corresponding to the width of channel 20 and extending rearwardly from back portion 125. Feet 126 engage the exterior surfaces of side walls 42, 44 of channel member 20 while the rear of back portion 125 engages the rear of base portion 20 of channel member 20. Back portion 125 and feet 126 allow the bracket to be welded in place along channel member 20. Extending outwardly from generally the middle of back portion 125 at the center of base 40 are a pair of parallel securing flanges 127 which receive a vertical edge of divider panel 120 therebetween for securement with a carriage bolt or the like. Similarly, a pair of securing flanges 128 are formed parallel to one another but extending at an angle to the securing flanges 127 for receipt of the diagonal divider panel 122. Flanges 128 are spaced outwardly from the side of the channel member on an extension of back portion 125 and receive a bolt therethrough for securing the diagonal divider panel 122. Divider panels 120 are secured to flanges 127 of brackets 124 on opposing end portions 46, 48 of the same channel member such that they extend parallel to the channel member and close off virtually the entire rectangular internal area within the channel member. Angled or truncated corners may be formed on panels 120, 122 to facilitate fitting of the panels within the channel. Panels 120 segregate each individual unit 12 from the next adjacent unit.

Figure 13:
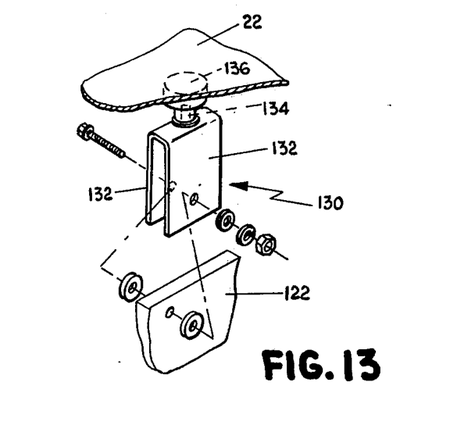
FIg. 13 is a fragmentary, perspective view of the bracket member for supporting the top of one of the diagonal partition panels within one of the storage units.

Divider panels 122 are bolted to flanges 128 of brackets 124 and extend on an angle across each unit 12 between opposite ends of the channel members on either side of the unit 12 dividing that unit into the two wedge-shaped spaces 14 and 16 mentioned above. Additionally, as shown in FIGS. 9 and 13, a generally U-shaped bracket 130 is bolted to the central portion of the upper edge of diagonal panel 122 to support the same beneath the center of the roof panel 22. Bracket 130 includes a pair of downwardly extending parallel leg flanges 132 depending from a stud 134 secured by a threaded member 136 to a downwardly depending molded member on the underside of the center of the roof panel. Leg flanges 132 engage opposite sides of panels 122 and are bolted thereto for support.

Preferably, the roof panels and end panels are stamped and pressed in single operations from a fiberglass-reinforced plastic sheet-molding compound SCM-7044 manufactured by General Tire and Rubber Company, Chemical Plastics Division, P. O. Box 510, Ionia, Mich. 48846. Side closures 100 are preferably formed from molded polypropylene plastic. Channels 20 and angle members 108 are preferably manufactured from aluminum to resist corrosion and degradation from the elements. Divider panels 120 and 122 are preferably made from stong, durable pressed chip board.

Accordingly, the channel members 20 provide the multiple functions of both joining and supporting the roof and end panels and providing structural load and stress bearing members, providing drainage channels or troughs for removing water from the assembled units, and supporting the divider panels within the units. The roof and end panels are light in weight, uncomplicated, and inexpensive to manufacture.

As will be seen from FIGS. 1 and 4, each individual unit 12 can store at least a pair of small vehicles, one in each wedge-shaped section as illustrated by the bicycles in those figures. Normally, the bicycle is backed into the storage space with the handle bars and front wheel being received in the widest portion of the wedge-shaped space. The individual units may be manufactured according to the size of the bike to be stored therein but normally are built in one size to accommodate larger bikes thereby allowing smaller bikes to be also accommodated. Each unit requires only a space slightly larger than the size of the bike while the structural channel members 20 allow efficient connection of the several units together in side-by-side fashion to minimize wasted space between each unit. Further, the secure fastening of the roof and end panels as well as the side closures to the connecting channel members prevents theft and vandalism from the storage enclosures and provides durability and long life for the storage units.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. Storage apparatus for small vehicles such as bicycles and motorcycles comprising at least one protective storage unit having generally opposite, lateral side edges, at least one roof member, a pair of generally opposite end members, and rigid channel means along at least one of said side edges of said storage unit for joining said roof and end members together and supporting said roof and end members in a protective structure over a supporting surface; said channel means including first wall means for joining said roof and end members to said channel means, second wall means for joining said storage unit to at least one of (1) another of said storage units, (2) a side closure, and (3) a wall or other generally upstanding surface, said first and second wall means defining a drainage channel therebetween which opens outwardly away from the interior of said unit for draining water off said unit; said roof and end members each including securing means on the other of said opposing side edges for joining said respective member to another of said channel means whereby said storage unit may be used individually or joined to other storage units in side-by-side fashion; hinge means for hingedly securing at least one of said end members to said channel means at one end of said storage unit for access to the interior of said unit; said channel means including a flange extending outwardly along the length thereof for securing said roof and end members thereto; said roof member extending the entire length of said storage unit between said end members and curving downwardly at either end immediately above said end members; said one hinged end member including an inwardly extending flange along either lateral edge and an end flange extending inwardly toward the interor of said unit at the upper end of said one end member; said hinge means secured between said channel flange and one of said side flanges of said one end member allowing said end member to be opened and closed; said channel flange including a slot receiving said upper end flange of said one end member when said one end member is closed.

2. Storage apparatus for small vehicles such as bicycles and motorcycles comprising at least one protective storage unit having generally opposite, lateral side edges, at least one roof member, a pair of generally opposite end members, and rigid channel means along at leat one of said side edges of said storge unit for joining said roof and end members together and supporting said roof and end members in a protective structure over a supporting surface; said channel means including first wall means for joining said roof and end members to said channel means, second wall means for joining said storage unit to at least one of (1) another of said storage units, (2) a side closure, and (3) a wall or other generally upstanding surface, said first and second wall means defining a drainage channel therebetween which opens outwardly away from the interior of said unit for draining water off said unit, said channel means being recessed inwardly of said roof and end members and extending continuously without interruption in a curve at each end thereof from roof portions which extend along at least a portion of said roof member adjacent either end thereof to its respective end portions which extend along said opposing end members whereby water drainage from said unit is facilitated; said roof and end members each including securing means on the other of said opposing side edges for joining said respective member to another of said channel means whereby said storage unit may be used individually or joined to other storage units in side-by-side fashion.

3. The storage apparatus of claim 1 wherein said rigid channel means is a continuous channel member extending from the supporting surface upwardly along one of said end members, along said roof member and downwardly along the other end member to the supporting surface.

4. The storage apparatus of claim 3 wherein said channel member is generally U-shaped in cross section, the opening of said U-shaped channel directed outwardly around the entire channel member.

5. The storage apparatus of claim 2 wherein said channel means includes a base, said first and second wall means including a pair of integral flanges spaced apart and extending in the same direction from said base, said flanges having outer edges, said base being recessed inwardly of said outer edges along said channel means to form said drainage channel.

6. The storage apparatus of claim 5 wherein said channel means includes a roof portion extending along said roof member between said end members on said one side of said unit, said roof portion having a midpoint intermediate said end members, said channel base sloping downwardly in opposite directions on either side of said midpoint to facilitate water drainage from the unit as well as structural support and weight bearing capabilities of said apparatus.

7. The storage apparatus of claim 6 wherein said roof member includes a center line extending between said end members, said roof member including portions sloping downwardly in opposite directions toward either lateral side edge to facilitate water drainage into said drainage channel.

8. The storage apparatus of claim 5 wherein said flanges extend upwardly along said roof member and outwardly along said end members; said roof member including downwardly extending flanges along either lateral side edge; said end members each including inwardly extending side edges along either lateral side edge; said flanges along one lateral side edge of each of said roof and end members overlapping and being secured to one of said spaced flanges of said channel means.

9. The storage apparatus of claim 8 including a side closure panel and angle means extending along the length of said channel means and having a pair of leg flanges extending generally at right angles and forming a generally L-shaped cross section for joining said channel means to said side closure panel, one of said leg flanges of said angle means being secured to the other of said channel flanges, the other of said leg flanges being secured to said side closure panel.

10. The storage apparatus of claim 2 including hinge means for hingedly securing at least one of said end members to said channel means at one end of said storage unit for access to the interior of said unit.

11. The storage apparatus of claim 10 including latch means operable from the exterior of said storage unit for locking said one end member in its closed position.

12. The storage apparatus of claim 10 including a second rigid channel means extending along the other of said lateral side edges for joining said roof and end members together and supporting said unit; second hinge means for hingedly securing the other of said end members to said second channel means at the opposite end of said storage unit for access to said unit from either end.

13. The storage apparatus of claim 12 wherein said second rigid channel means enables said unit to be secured to at least one of (1) another of said units, (2) a side closure, and (3) a wall or other generally upstanding surface; first divider means extending at an angle across the interior of said unit for dividing said unit interior into two generally wedge-shaped spaces; means for securing said first divider means between the inside surface of one end of the first of said channel means and the inside surface of the opposite end of said second channel means; second divider means extending between opposite ends of the first of said channel means for separating said unit from the next; means for securing said second divider means between the inside surfaces of the opposite ends of the first of said channel means; each of said hinged end members providing access to only one of said wedge-shaped interior spaces.

14. The storage apparatus of claim 2 wherein said storage unit includes second rigid channel means along the other of said lateral side edges for joining said roof and end members together, supporting said unit, and enabling said unit to be secured to at least one of (1) another of said units, (2) a side closure, and (3) a wall or other generally upstanding surface; divider means extending at an angle across the interior of said unit for dividing said unit interior into two generally wedge-shaped spaces and means for securing said divider means between the inside surface of one end of the first of said channel means and the inside surface of the opposite end of said second channel means.

15. Storage apparatus for small vehicles such as bicycles and motorcycles comprising at least one storage unit including a roof member having a length, width, and lateral sides and downwardly extending flanges along said lateral sides; first and second opposing end members each approximating the width of said roof member and having inwardly extending flanges on opposite lateral edges thereof; and connection means on at least one side of said storage unit for joining said roof and end members together to form a protective structure over a supporting surface, said connection means including rigid channel means having a base and integral flanges spaced apart and extending in the same direction from said base and forming a generally outwardly directed U-shaped channel opening along said channel means extending along said roof and end members, said flanges on said channel means extending upwardly along said roof member and outwardly along said end members such that said channel opening opens outwardly generally away from the interior of said storage unit, said channel means being recessed inwardly of said roof and end members and extending continuously without interruption in a curve at each end thereof from roof portions which extend along at least a portion of said roof member adjacent either end thereof to its respective end portions which extend along said opposing end members whereby water drainage from said unit is facilitated; securing means for securing one of said downwardly extending side flanges on said roof member and one of said lateral flanges on at least one of said end members to one of said spaced flanges on said channel means whereby the other of said flanges of said channel means is adapted to be secured to at least one of a (1) side closure panel, (2) a wall or other generally upstanding surface, and (3) another of said storage units to close said one side of said storage unit, and the other of said flanges on said roof and end members being adapted to be secured to another of said channel means, said securing means including means for adjusting the position of said roof member with respect to said channel means; one of said downwardly extending flanges of said roof member overlapping at least a portion of said securing means in spaced relation thereto; at least the said portion of said securing means for securing said roof member to said flange of said channel means being concealed by said overlapped roof flange and difficult to gain access to after installation of said roof member from the apparatus exterior to reduce theft and vandalism from said storage apparatus.

16. Storage apparatus for small vehicles such as bicycles and motorcycles comprising at least a pair of storage units and connection means for joining said units together in side-by-side relationship; each of said storage units including at least one roof member and generally opposing end members; said connection means including rigid channel means located between said storage units, extending along and between said roof members and end members on said pair of units, and spacing said units apart for supporting said roof and end members in each of said units in a protective structure over a supporting surface; said channel means including wall means for securing said roof and end members of each of said storage units to said channel means, said channel means being recessed inwardly of said roof and end members and extending continuously without interruption in a curve at each end thereof from roof portions which extend along at least a portion of said roof members adjacent either end thereof to its respective end portions which extend along said opposing end members whereby water drainage from said units is facilitated.

17. The storage apparatus of claim 16 wherein said rigid channel means is a continuous channel member extending from the supporting surface upwardly along one of said end members, along said roof member and downwardly along the other end member to the supporting surface.

18. The storage apparatus of claim 17 wherein said channel means includes a portion recessed below said roof members and providing a drainage channel for collecting and draining water from said units.

19. The storage apparatus of claim 18 wherein said said channel member is generally U-shaped in cross section, the opening of said U-shaped channel directed outwardly around the entire channel member.

20. The storage apparatus of claim 18 wherein said channel means includes a base, said wall means including a pair of integral flanges spaced apart and extending in the same direction from said base, said flanges having outer edges, said base being recessed inwardly of said outer edges along said channel means to form said recessed channel portion.

21. The storge apparatus of claim 20 wherein said flanges extend upwardly along said roof member and outwardly along said end members; said roof member including downwardly extending flanges along either lateral side edge; said end members each including inwardly extending side edges along either lateral side edge; said flanges along one lateral side edge of said roof and at least one of said end members overlapping and being secured to one of said spaced flanges of said channel means.

22. The storage apparatus of claim 17 also including second rigid channel means extending along and secured to the side edge opposite said first channel means on at least one of said storage units for joining said roof and end members of said one unit together, supporting said one unit, and enabling said one unit to be secured to at least one of (1) another of said units, (2) a side closure, and (3) a wall or other generally upstanding surface; first divider means extending at an angle across the interior of said one unit for dividing said one unit interior into two generally wedge-shaped spaces; second ad third divider meas extending between opposite ends of said first and second channel means respectively for separating said one unit from said other units and enclosing said wedge-shaped spaces; means for securing said first divider means between the inside surface of one end of said first channel means and the inside surface of the opposite end of said second channel means; means for securing said second and third divider means between the inside surfaces of the opposite ends of said respective first and second channel means; hinge means for hingedly securing each of said opposite end members to one of said channel means at opposite ends of said one unit for access to said wedge-shaped spaces, each hinged end member allowing access to only one wedge-shaped interior space.

23. The storage apparatus of claim 22 including latch means on each of said hinged end members and operable from the exterior of the respective end members for engaging said channel means and locking said end members in their closed positions.

* * * * *

UNITED STATES PATENT AND TRADEMARK OFFICE
CERTIFICATE OF CORRECTION

PATENT NO. : 4,016,686
DATED : April 12, 1977
INVENTOR(S) : Richard W. Hartger
Richard W. Figgins It is certified that error appears in the above-identified patent and that said Letters Patent are hereby corrected as shown below:

Assignees;
    "Richard W. Harger" should be --Richard W. Hartger--;
Column 5, line 52;
    "brackes" should be --brackets--;
Column 7, line 20;
    "20" (first occurrence) should be --40--;
Column 9, Claim 2, line 18;
    "leat" should be --least--;
Column 9, Claim 2, line 18;
    "storge" should be --storage--;
Column 9, Claim 3, line 43;
    "1" should be --2--;
Column 12, Claim 22, line 49;
    "ad" should be --and--;
Column 12, Claim 22, line 49;
    "meas" should be --means--.

Signed and Sealed this twenty-third Day of August 1977

[SEAL]

Attest:

RUTH C. MASON
*Attesting Officer*

C. MARSHALL DANN
*Commissioner of Patents and Trademarks*